US011087368B1

(12) United States Patent
Coffman et al.

(10) Patent No.: US 11,087,368 B1
(45) Date of Patent: Aug. 10, 2021

(54) SYSTEM FOR PROVIDING SALES GATEWAY BETWEEN AGENCIES AND ADVERTISERS TO AD PLATFORM

(71) Applicant: INNOVAR MEDIA LLC, Irving, TX (US)

(72) Inventors: Webster Shawn Coffman, Norman, OK (US); Steve Laughlin, Mckinney, TX (US)

(73) Assignee: INNOVAR MEDIA LLC, Irving, TX (US)

( * ) Notice: Subject to any disclaimer, the term of this patent is extended or adjusted under 35 U.S.C. 154(b) by 0 days.

(21) Appl. No.: 17/025,012

(22) Filed: Sep. 18, 2020

(51) Int. Cl.
    *G06Q 30/02* (2012.01)

(52) U.S. Cl.
    CPC ..... *G06Q 30/0276* (2013.01); *G06Q 30/0246* (2013.01); *G06Q 30/0247* (2013.01); *G06Q 30/0273* (2013.01)

(58) Field of Classification Search
    CPC .......... G06Q 30/0276; G06Q 30/0273; G06Q 30/0247; G06Q 30/0246
    See application file for complete search history.

(56) References Cited

U.S. PATENT DOCUMENTS

| | | | |
|---|---|---|---|
| 8,103,546 B1 * | 1/2012 | Des Jardins ....... | G06Q 30/0277 705/14.73 |
| 10,657,254 B1 * | 5/2020 | Stoletny .................. | G06F 21/54 |
| 2002/0120505 A1 * | 8/2002 | Henkin .................. | G06Q 30/02 705/14.69 |
| 2012/0166267 A1 * | 6/2012 | Beatty ................. | G06Q 30/0219 705/14.21 |
| 2012/0221408 A1 * | 8/2012 | Pych ................... | G06Q 30/0251 705/14.43 |
| 2013/0036013 A1 * | 2/2013 | James ................. | G06Q 30/0256 705/14.66 |

(Continued)

OTHER PUBLICATIONS https://www.prnewswire.com/news-releases/comcast-technology-solutions-unveils-new-integration-for-centralized-advertising-campaign-management-across-digital-and-linear-tv-audiences-301258076.html (Year: 2021).*

*Primary Examiner* — Michael W Schmucker
*Assistant Examiner* — Christopher C Busch

(57) ABSTRACT

A sales gateway controls transactions between advertising buyers and advertising platforms. A server coupled to the first and second interfaces implements a sales gateway to control transactions between the at least one advertising buyer and the at least one advertising platform responsive to a stored set of instructions. A memory coupled to the server stores the set of instructions for implementing the sales gateway. The stored set of instructions configuring the server to generate a link to provide a particular service responsive to a user request. The server validates information relating to a proposal and submits the proposal via the first interface using a pre-buy/proposal service of the sales gateway. The server transfers media content from the at least one advertising buyer to the at least one advertising platform using a media service of the sales gateway. The server submits instructions for running the media content on the at least one advertising platform from the at least one advertising buyer to the at least one advertising platform using a creative instructions service of the sales gateway. The server submits campaign performance results from the advertising platform to the at least one advertising buyer using a post buy service of the sales gateway.

27 Claims, 20 Drawing Sheets

(56) References Cited

U.S. PATENT DOCUMENTS

2014/0143835 A1* 5/2014 Brennan ............... G06F 40/114
  726/4
2016/0379269 A1* 12/2016 Ellis ..................... H04L 67/306
  705/14.45

* cited by examiner

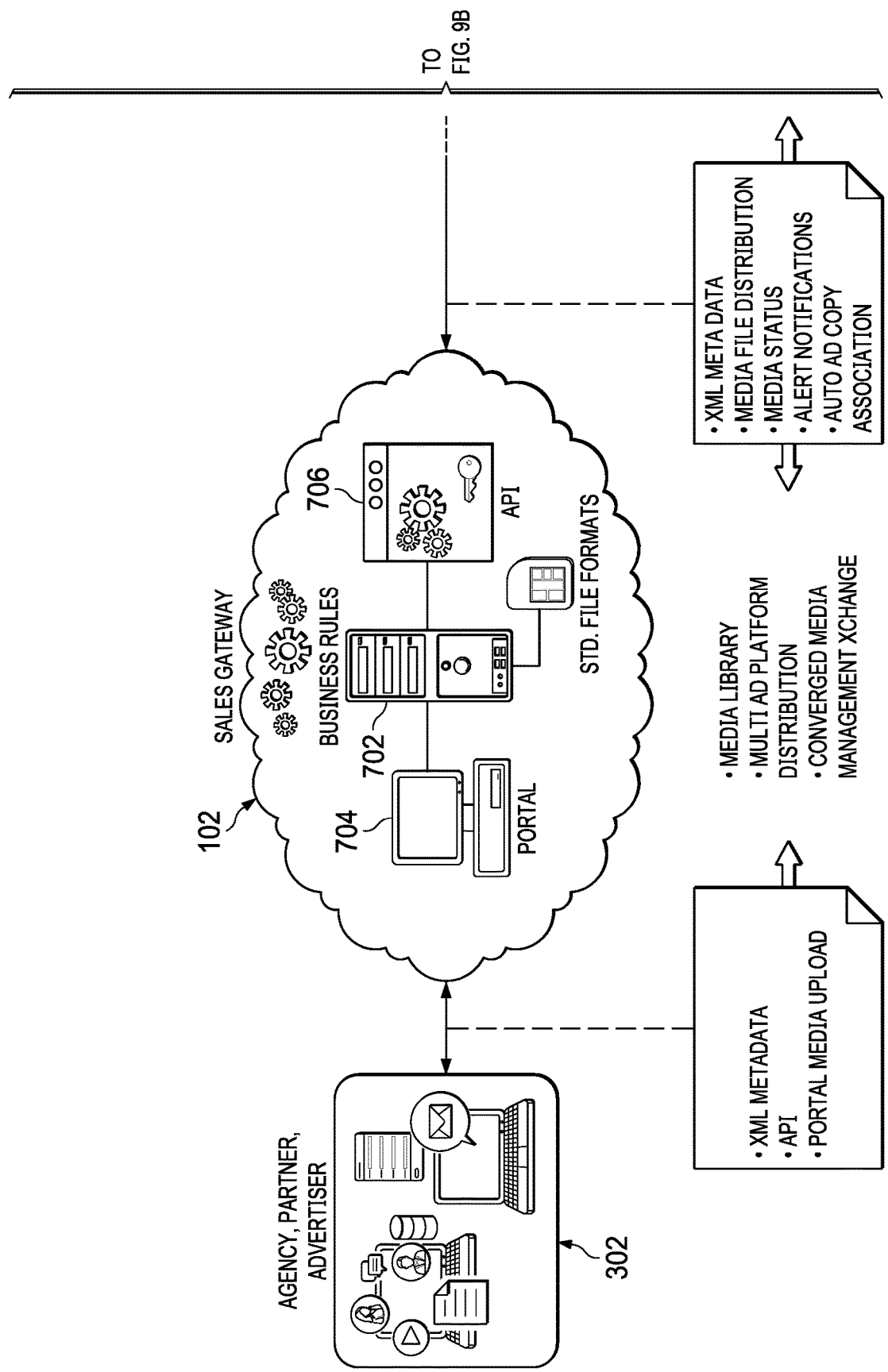

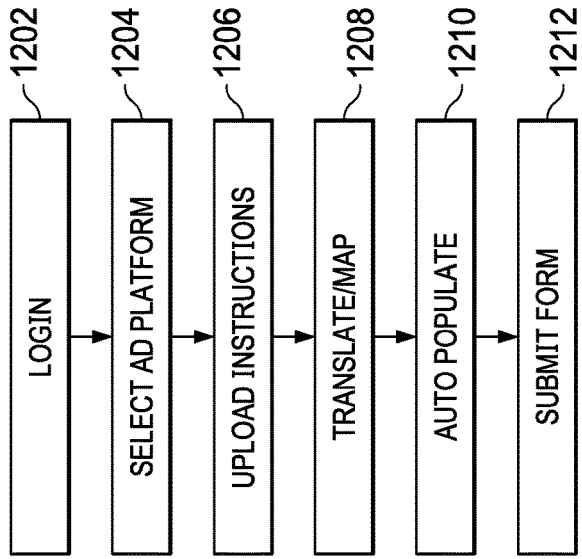
FIG. 12
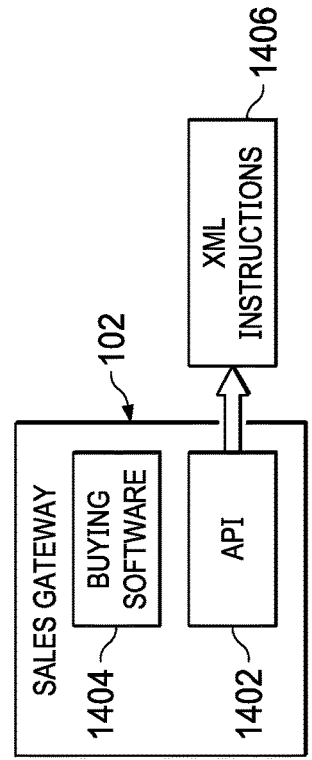
FIG. 14
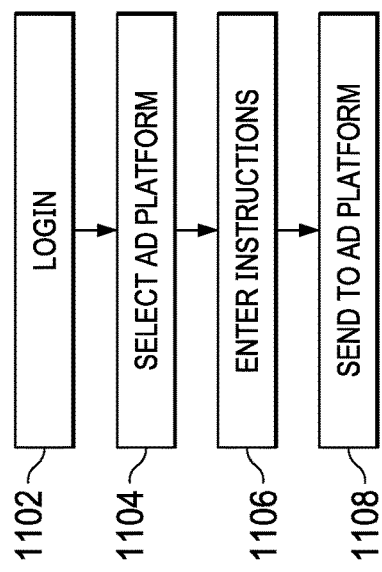
FIG. 11
FIG. 13

| Action | Agency Name ⇅ | Advertiser Name ⇅ | Order Number ⇅ | Client CD ⇅ | Product CD ⇅ | Estimate ID ⇅ |
|---|---|---|---|---|---|---|
| | All ▼ | | | | | |
| 📄 ✱ | The Best Agency Ever | RAUL | REVIEW | | FLTDATEVALIDATION | 10013 |
| 📄 ✱ | ACME | RAUL | REVIEW | RAUL | FLTDATEVALIDATION | 10012 |
| 📄 ✱ | ACME | RAUL | TESTING | INNOVAR | FLTDATEVALIDATION | 09301 |

FIG. 16A

| AOP 1618 | Start Date 1620 | End Date 1622 | Last Received 1624 | Date Received 1626 | Date Response Sent |
|---|---|---|---|---|---|
| All ▶ | | | | | |
| Spectrum - DEV/QA | 10/07/2019 | 10/26/2019 | 10/01/2019 22:02:03 | 10/01/2019 18:02:03 | |
| Spectrum - DEV/QA | 10/07/2019 | 10/26/2019 | 10/01/2019 22:02:03 | 10/01/2019 18:02:03 | |
| Spectrum - DEV/QA | 10/07/2019 | 10/26/2019 | 09/30/2019 21:42:02 | 09/30/2019 17:42:02 | 10/01/2019 15:59:02 — 1628 |

FROM FIG. 16A

✐ Ad Copy Instructions

Advertiser: ACMEI ⟋1706    Order #: THURS2 ⟋1708

Flight Start: 09/16/2019 ⟋1714    Flight End: 12/29/2019 ⟋1716

[10 ▲] per page ⟋1718

| Trans ID ⇅ | InnVue Trans ID ⟋1720 | Trans Date ⟋1722 ⇅ | Status ⟋1724 ⇅ | Type ⟋1726 ⇅ | Length ⟋1728 ⇅ | Zones ⟋1730 ⇅ |
|---|---|---|---|---|---|---|
| ✚ NEWORDER | 5380fc3c-7357-487f-a8f0-949fb0155554 | 09/05/2019 | Success | New | 30 | 7046, 7053, 7000,... |
| ✚ NEWORDER | a8ce3d2d-5010-4214-b2f7-8b297759a56a | 09/05/2019 | Success | New | 30 | 7046, 7053, 7000,... |
| ✚ NEWORDER | 8c772f04-d620-463b-89b4-cac28bc86933 | 09/05/2019 | Success | New | 30 | 7046, 7053, 7000,... |
| ✚ CHANGEORDER1 | ac4281cf-c169-42b1-b9f8-457fc67c494b | 09/05/2019 | Success | Change | 30 | 7046, 7053, 7000,... |
| ✚ CHANGEORDER1 | df8b4bd0-aa4c-494f-bf91-6a99d8aab6fc | 09/06/2019 | Success | Change | 30 | 7046, 7053, 7000,... |
| ✚ CHANGEORDER1 | 7ff61b9c-0051-452c-a9c9-1c3acfl36615 | 09/06/2019 | Success | Change | 30 | 7046, 7053, 7000,... |
| ✚ CHANGEORDER1 | 0dba274b-425a-4f77-8b46-afd949500bf3 | | | | | |

FIG. 17A

AOP: Spectrum - UAT

Estimate ID: 09052 — 1710

| Item Type (1732) | Bookend ID (1734) | Bookend Seq (1736) | Start (1738) | End (1740) | Creative Name (1742) | ISCI (1744) | Rotation Type (1746) | Rotation Value (1748) |
|---|---|---|---|---|---|---|---|---|
| Original | | | 09/16/2019 | 09/29/2019 | | AnvilDrop9052A | P | 100 |
| Changed | | | 09/16/2019 | 10/15/2019 | | AnvilDrop9052A | P | 100 |
| Add | | | 10/16/2019 | 10/30/2019 | | TheChase09052A | P | 100 |
| Add | | | 10/31/2019 | 12/29/2019 | | TheChase9052B | P | 100 |

FROM FIG. 17A

| AD COPY ROLL-UP HEADER FIELDS | DESCRIPTION |
|---|---|
| Advertiser | Advertiser Name from .ACW file |
| Order Number | Agency Order number if included in the Transaction File |
| Estimate ID | Agency's Estimate number and is used to map to the Instruction to the Order when it arrives at the MVPD |
| AOP | MVPD Environment to which the file was sent |
| Flight Start | Start Date of Order |
| Flight End | End Date of Order |
| PAGE COLUMNS | DESCRIPTION |
| Transaction ID | The Transaction ID is a field the Agency or Advertiser can use to input its own unique identifier for the Transaction File |
| InnVue Trans ID | The InnVue Trans ID is the InnVue applications unique identifier for the individual Transaction File assigned by the application during receipt of file |
| Transaction Date | Original submission date of the original file |
| Status | Success or Error |
| Type | New or Change |
| Length | Length of Copy or Media |
| Zones | Zones included in .ACW file |
| Item Type | Original, Changed, Add |
| Bookend ID | Unique ID for the creative bookend group (Bookends will be available in an upcoming release) |
| Bookend Sequence | Order in which each piece of Copy should run in the Bookend pairing (Bookends will be available in an upcoming release) |
| Start | First air date of the schedule |
| End | Last air date of the schedule |
| Creative Name | Name of the piece of Copy |
| ISCI | ISCI Code associated with the piece of Copy |
| Rotation Type | P = Percentage, No value = Even |
| Rotation Value | Percent (%) or Ratio of Rotation to be assigned to the piece of Copy IMPORTANT NOTE: Percent (%) values only in current release. Ratios will be available in a future release |
| First Day Start | Time of day the spot should start on the first day the spot is scheduled |
| Last Day Start | Time of day the spot should end on the last day the spot is scheduled |
| Days Start Time | Daily start time the spot is scheduled |
| Days Stop Time | Daily stop time the spot is scheduled |
| Day | Day(s) of Week the spot is to run (Available in a future release - current default is ALL Days) |
| Nets | Networks to be included/excluded (Available in a future release - current default is ALL Networks) |

| TRANSACTION REPORT PAGE COLUMNS | DESCRIPTION |
|---|---|
| 1802 Action Buttons | Details, XML and History |
| 1804 Agency | Agency associated with the AOP ID used in the .ACW file |
| 1806 Transaction ID | The Transaction ID is a field the Agency or Advertiser can use to input its own unique identifier for the Transaction File |
| 1808 InnVue Transaction ID | The InnVue Trans ID is the InnVue applications unique identifier for the individual Transaction File assigned by the application during receipt of file |
| 1810 Status | Current Status of the file in the workflow (see section on Status definitions for additional information) |
| 1812 Advertiser Name | Advertiser Name from .ACW file |
| 1814 Order Number | Agency Order number if included in the Transaction File |
| 1816 Client CD | Agency Client Code if included in the Transaction File |
| 1818 Product CD | Agency Product Code if included in the Transaction File |
| 1820 Estimate ID | Agency's Estimate number and is used to map to the Instruction to the Order when it arrives at the MVPD |
| 1822 Syscode | Syscode/Zones included in the .ACW File |
| 1824 Start Date | Flight Start Date |
| 1826 End Date | Flight End Date |
| 1828 AOP | MVPD Environment to which the file was sent |
| 1830 Service | Ad Copy, Media (Phase 2), Proposal (Phase 2) |
| 1832 Received | Date and Time the specific Transaction file was received |
| 1834 Processed | Date and Time the specific Transaction file was processed |
| 1836 Responded | Date and Time the MVPD sent a response via the Outbound XML back to the agency |
| 1838 Last Updated | The Last Date and Time there was any update related to this specific Transaction File |

FIG. 18

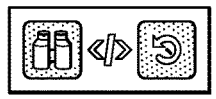

| AD COPY ROLL-UP HEADER FIELDS | DESCRIPTION |
|---|---|
| Advertiser | Advertiser Name from .ACW file |
| Order Number | Agency Order number if included in the Transaction File |
| Estimate ID | Agency's Estimate number and is used to map to the Instruction to the Order when it arrives at the MVPD |
| AOP | MVPD Environment to which the file was sent |
| Flight Start | Flight Start Date |
| Flight End | Flight End Date |
| PAGE COLUMNS | DESCRIPTION |
| Transaction ID | The Transaction ID is a field the Agency or Advertiser can use to input its own unique identifier for the Transaction File |
| InnVue Trans ID | The InnVue Trans ID is the InnVue applications unique identifier for the individual Transaction File assigned by the application during receipt of file |
| Transaction Date | Original submission date of the original file |
| Status | Success or Error |
| Type | New (Instruction) or Change (Order) |
| Length | Length of Copy or Media |
| Zones | Syscodes/Zones included in .ACW file |
| Item Type | Original, Changed, Add (Original Instruction, Changes received in a Change Order to existing instruction or Added to an Instruction via a Change Order.) |
| Bookend ID | Unique ID for the creative bookend group (Bookends are Phase 2) |
| Bookend Sequence | Order in which each piece of Copy should run in the Bookend pairing (Bookends are Phase 2) |
| Start | First air date of the schedule |
| End | Last air date of the schedule |
| Creative Name | Name of the piece of Copy |
| ISCI | ISCI Code associated with the piece of Copy |
| Rotation Type | P = Percentage, No value = Even |
| Rotation Value | Percent (%) or Ratio of Rotation to be assigned to the piece of Copy |
| First Day Start | Time of day the spot should start on the first day the spot is scheduled |
| Last Day Start | Time of day the spot should end on the last day the spot is scheduled |
| Days Start Time | Daily start time the spot is scheduled |
| Days Stop Time | Daily stop time the spot is scheduled |
| Day | Day(s) of Week the spot is to run |
| Nets | Networks to be included/excluded |

FIG. 19

SYSTEM FOR PROVIDING SALES GATEWAY BETWEEN AGENCIES AND ADVERTISERS TO AD PLATFORM

TECHNICAL FIELD

The present invention relates to a system for managing processes for interactions between advertising agencies/advertisers and advertising platforms, and more particularly to a system for providing centralized control of the interactions between advertising agency/advertisers and advertising platforms.

BACKGROUND

Interactions between advertising agencies/advertisers and advertising platforms require a number of time intensive and complex processes in order to enable the purchasing of advertising space and generating the advertising content for broadcast in the advertising space. The process of buying ad inventory is complex and time-consuming requiring a great deal of manual effort and interaction between agencies/advertisers and ad platforms. The ability to simplify and automate the critical interactions between agency/advertisers and ad platforms within the purchasing of ad inventory would greatly improve the efficiencies of the process.

SUMMARY

The present invention, as disclosed and described herein, in one aspect thereof, comprises a sales gateway for controlling transactions between advertising buyers and advertising platforms. A server coupled to first and second interfaces implements a sales gateway to control transactions between at least one advertising buyer and the at least one advertising platform responsive to a stored set of instructions. A memory coupled to the server stores the set of instructions for implementing the sales gateway. The stored set of instructions configure the server to generate a link to provide a particular service responsive to a user request. The server validates information relating to a proposal and submits the proposal via the first interface using a pre-buy/proposal service of the sales gateway. The server transfers media content from the at least one advertising buyer to the at least one advertising platform using a media service of the sales gateway. The server submits instructions for running the media content on the at least one advertising platform from the at least one advertising buyer to the at least one advertising platform using a creative instructions service of the sales gateway. The server submits campaign performance results from the advertising platform to the at least one advertising buyer using a post buy service of the sales gateway.

BRIEF DESCRIPTION OF THE DRAWINGS

For a more complete understanding, reference is now made to the following description taken in conjunction with the accompanying Drawings in which:

FIGS. 9A and 9B illustrate the various processes provided by the Creative Instruction Services;

FIG. 11 illustrates a flow chart for a process for sending creative instructions for media;

FIG. 12 illustrates a flow chart for an additional process for sending creative instructions for media;

FIG. 13 illustrates a flow chart for a further process for sending creative instructions for media;

FIG. 14 illustrates and application program interface for providing creative instructions for media;

FIGS. 16A and 16B illustrate a summary page of the sales gateway;

FIGS. 17A-17C illustrate and ad copy roll-up report;

FIG. 18 illustrates a transaction report;

FIG. 19 illustrates information associated with a transaction; and

DETAILED DESCRIPTION

Figure 1:
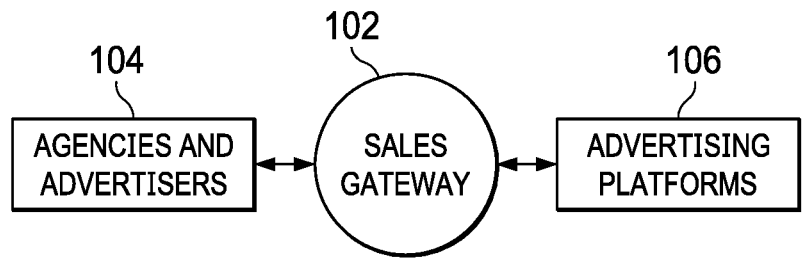
FIG. 1 illustrates a block diagram of a system including a sales gateway for interconnecting agencies/advertisers and advertising platforms.

Referring now to the drawings, wherein like reference numbers are used herein to designate like elements throughout, the various views and embodiments of a system for providing a sales gateway between agencies and advertisers to ad platforms are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

FIG. 1 illustrates a general block diagram illustrating the manner in which the sales gateway 102 interconnects agencies and advertisers 104 and advertising platforms 106. The sales gateway 102 enables centralized control of the ad buying process occurring between the agencies and advertisers 104 and the advertising platforms 106. The ad buying process controlled by the sales gateway 102 may comprise cable advertising, broadcast television advertising, radio advertising, satellite advertising or any other type of network involving the purchasing and presentation of advertising media to consumers of the network.

The agencies and advertisers 104 comprise ad buyers that are purchasing advertising space for display on a particular network. The advertising platforms 106 comprise ad fulfillment platform such as cable, broadcast TV, satellite, radio, internet, etc. over which the purchased ads may be displayed to consumers. The sales gateway 102 comprises a cloud-based service enabling buyers to register, set up a user profile, set up teams, etc. in order to enable the purchase of advertising content space. The sales gateway 102 enable buyers to request a link, called an "AOP link" to enable connections between the sales gateway 102 and the advertising agencies and advertisers 104 and advertising platforms 106 to provide a particular service.

Figure 2:
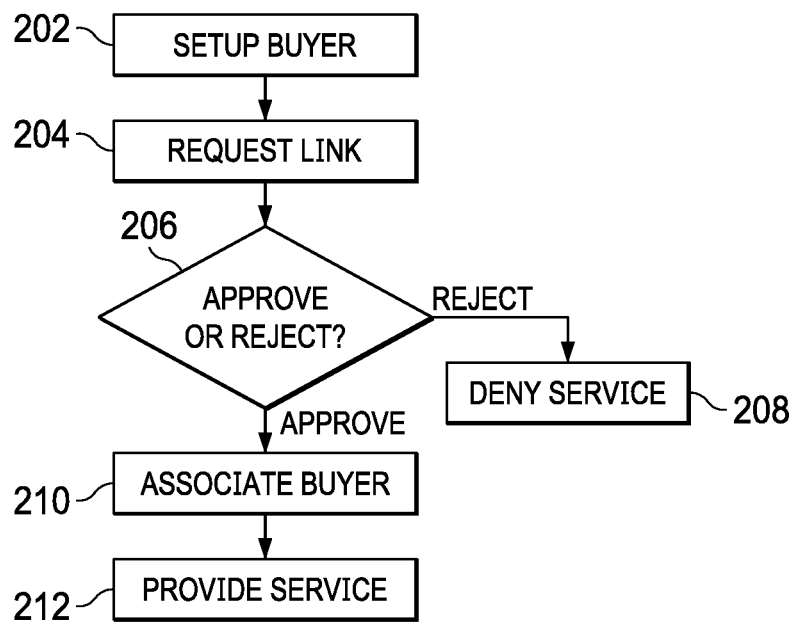
FIG. 2 illustrates a flow diagram for establishing an AOP link.

Referring now to FIG. 2, there is illustrated a flow diagram of the process for establishing an AOP link to provide various services through the sales gateway 102. Initially ad buyers must set up an account with the sales gateway 102 at step 202. Once a buyer has set up an account, they may request at step 204 a link ("AOP link") for a particular advertising operations partner. The AOP link provides a connection between the advertising buyer and a particular ad fulfillment platform or Advertising Operations Partner (AOP) 106. An ad fulfillment platform customer has a license to the ad management platform that receives the buyer request for a link and makes a determination of whether to approve or reject the request at inquiry step 206. If the request is rejected, the service is denied at step 208. Upon approval of the link request, the ad platform 106 associates the buyer and their operational system at step 210. The buyer may then be provided with the requested service at step 212. In providing services, the sales gateway 102 translates between the buyer associated with the agencies and advertisers 104 and the buyer within the advertising platforms operational systems 106. This is achieved by maintaining a mapping of the buyer ID of the agencies and advertisers 104 to all buyer IDs within the ad platforms 106 various systems. These systems include Customer Relationship Management (CRM) systems, proposal management systems, Order Management Systems (OMS), traffic systems, billing systems, etc.

Figure 3:
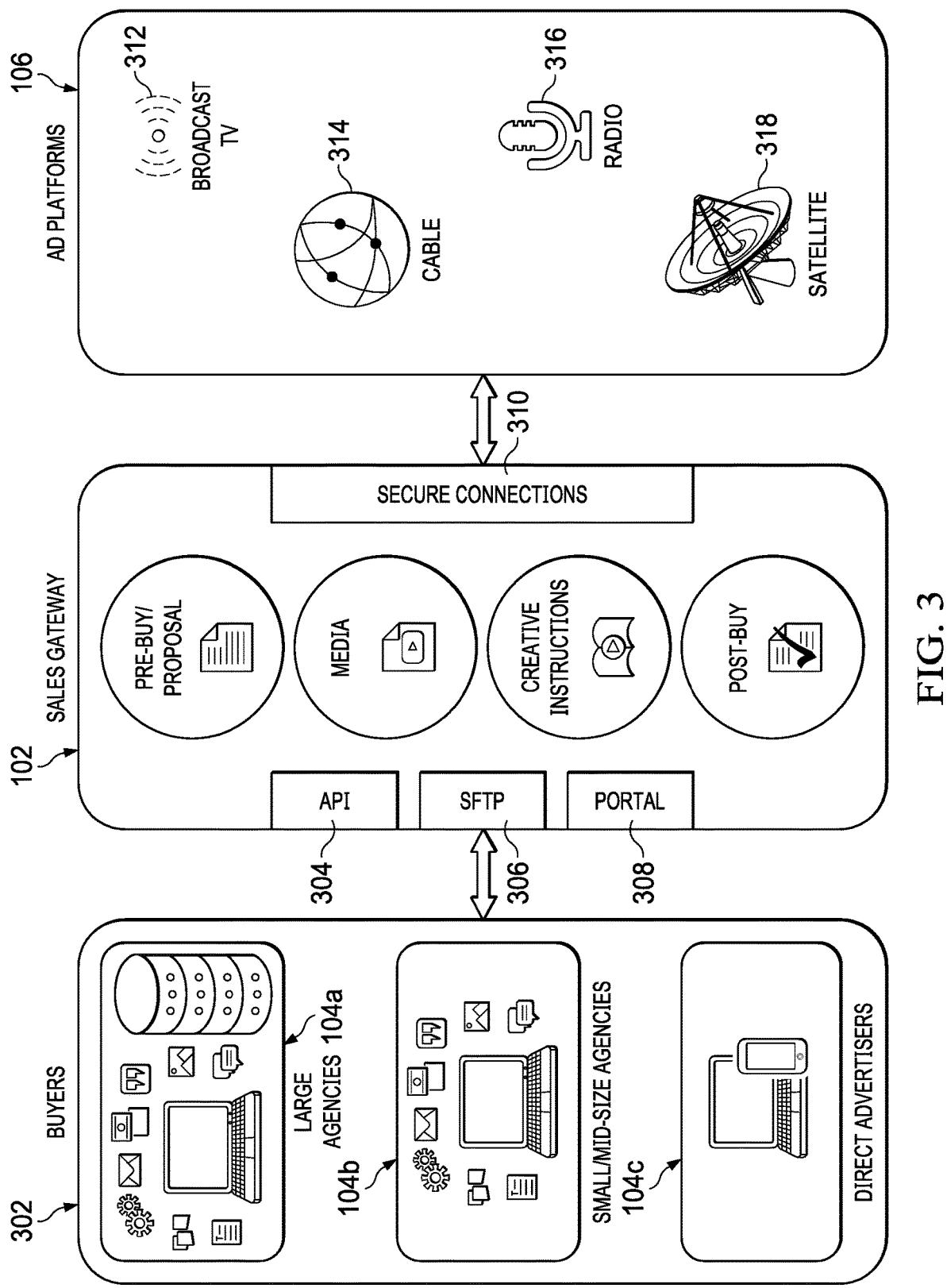
FIG. 3 illustrates a more detailed diagram of a system including a sales gateway interconnecting agencies/advertisers and advertising platforms.

Referring now to FIG. 3 there is provided a more detailed illustration of the components of FIG. 1. The sales gateway 102 interconnects with the various agencies and advertisers 104 that comprise the buyers 302 of the advertising inventory. The different types of buyers 302 comprise advertisers and agencies 104 representing large agencies 104a, small/midsize agencies 104b and direct advertisers 104c. These comprise examples of certain types of buyers 302 but any buyer of advertising inventory may utilize the sales gateway 102. The interface between the sales gateway 102 and the buyers 302 may be provided via an application program interface 304, SFTP (SSH File Transfer Protocol) interface 306 and a portal interface 308. The sales gateway 102 communicates with the ad platforms 106 via secure connections 310. The secure connections 300 may be provided to various types of ad platforms 106 including broadcast 312 TV, cable TV 314, radio 316 and satellite 318. Once the connection between the buyers 302 and various ad platforms 106 is established, the sales gateway 102 may provide a number of services including pre-buy/proposal services 320, media services 322, creative instructions services 324 and post-buy services 328.

Figure 4:
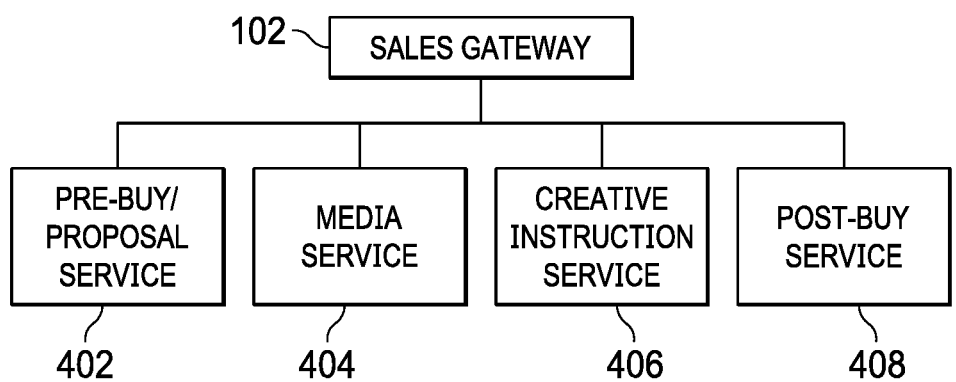
FIG. 4 illustrates the various services provided by the sales gateway.

Referring now to FIG. 4, there is more particularly illustrated the various services provided by the sales gateway 102 through the AOP link. These services include pre-buy/proposal services 402, media services 404, creative instructions services 406 and post-buy services 408. The pre-buy/proposal service 402 enables buyers 302 to validate information on a potential proposal or campaign and submit the proposal to the ad platform 106. Information that may be validated include checking inventory, pricing, ad clearance probability, etc. The media services 404 enable buyers 302 or representatives of buyers to distribute media to an ad platform 106. Media comprises the actual commercials (usually in a digital format) that are to be played by the ad platform 106. Creative instructions services 406 enable buyers 302 to submit creative instructions to an ad platform 106. The creative instructions tell the ad platform 106 how to run the buyer's commercials. The post by service 408 enables buyers to receive information describing the performance of their campaign running on the ad platform 106. This information may be used to provide insight to the buyer indicating the need to extend the campaign, purchase more inventory, set expectations with their advertising client or help with establishing campaigns in the future. Buyers 302 can receive performance/pacing information detailing how their campaign is running within the ad platform 106. This allows the buyers 302 to adjust parameters of their campaign to ensure that they are meeting their goals.

Figure 5:
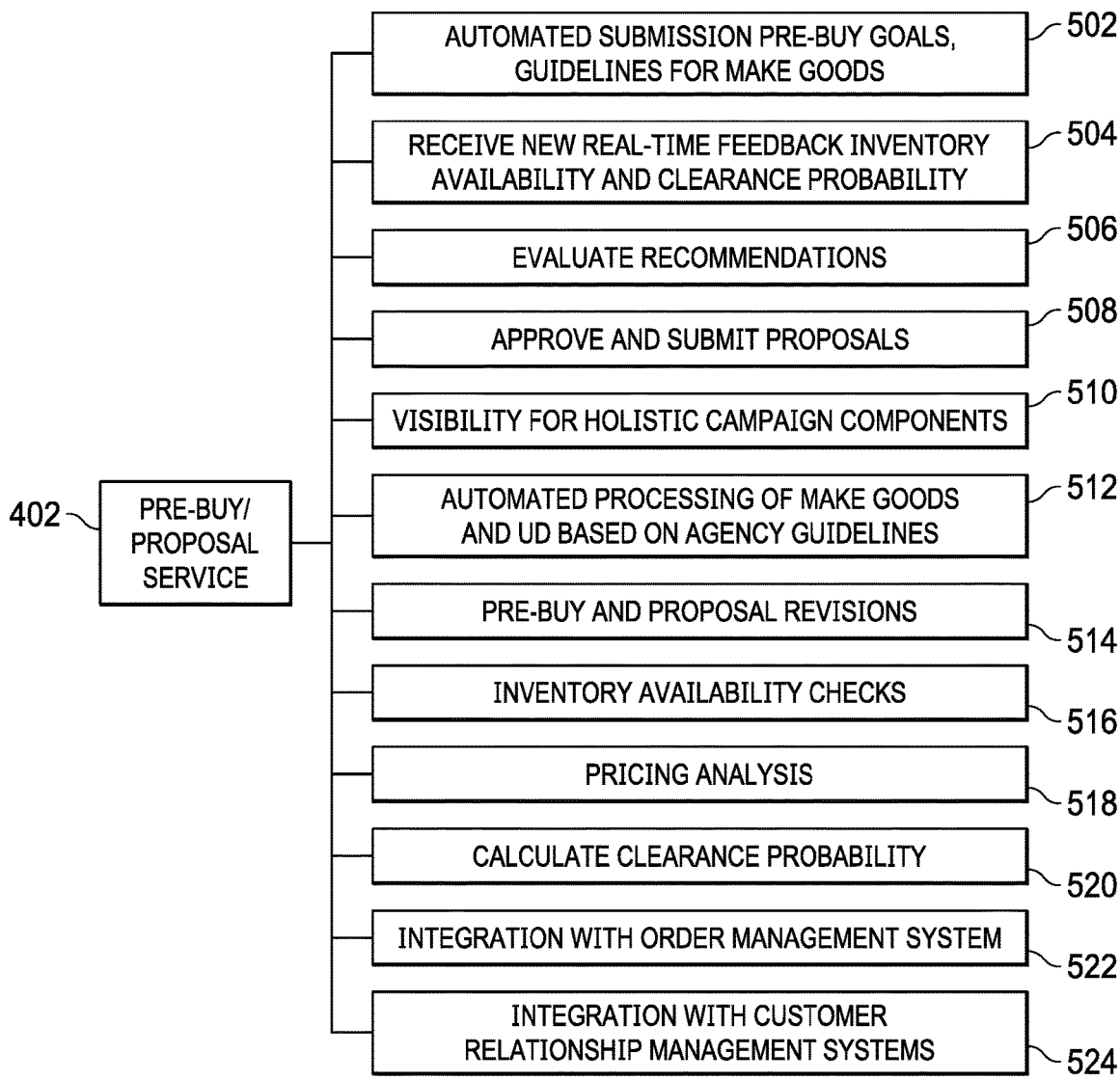
FIG. 5 illustrates the various processes provided by the Pre-Buy/Proposal Services.
Figure 6:
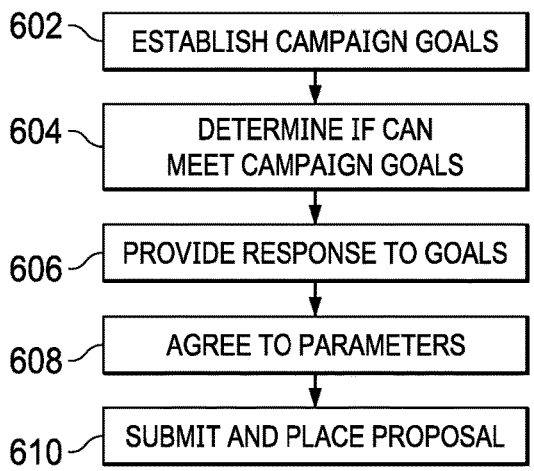
FIG. 6 illustrates the operation of the Pre-Buy/Proposal Services within the system.

Referring now to FIG. 5, there is more particularly illustrated the various functionalities provided by the pre-buy/proposal services 402 and post buy services 408. The pre-buy/proposal services 402 enable buyers to check the potential success of their campaign before formally submitting it to an ad platform 106. Referring now also to FIG. 6, a buyer will establish some campaign goals at step 602 with respect to the campaign they wish to provide on an ad platform 402. The campaign goals may comprise things such as budget, flight dates, audience they are trying to reach, number of impressions or spots they want to achieve, etc. This information is provided to the ad platform 106 to be validated. If the buyer 302 has an approved AOP link for the pre-buy/proposal service 402 with the ad platform 106, the sales gateway 102 will communicate with the systems of the ad platform 106 to determine if they can fulfill the campaign goals at step 604. The sales gateway 102 is connected to the buyers 302 operational systems such as CRM, Proposal Management, OMS, traffic, inventory, pricing, etc. in order to help with making the determination of whether the campaign goals can be met. For example, a system within the ad platforms 106 back office may check inventory availability with respect to pre-buy and proposal request provided by the proposed campaign goals. The ad platform 102 will determine if there is enough inventory and whether the ad platform wants to accept the proposed pricing established within the campaign from the buyer 302. A response to the proposed ad campaign goals is provided at step 606. Additionally, the ad platform may provide as a response suggesting alternative pricing to the buyer 302 in order to help achieve campaign fulfillment. Once the buyer 302 and the ad platform 106 agree to campaign parameters at step 608, the buyer 302 can submit the proposal to the ad platform 106, and the sales gateway 102 automatically places the proposal within each of the required systems of the ad platforms.

Referring now back to FIG. 5, the pre-buy/proposal services 402 of the sales gateway 102 provide a number of different functionalities that are useful during the pre-buy proposal process as described hereinabove. The functionalities include the ability to provide automated submissions of pre-buy goals 502 from buyers 302 to ad platform partners 106 and guidelines for Make Goods and UD (under delivery). The services also provide the ability to receive near real-time feedback for both inventory availability and clearance probability 504. The pre-buy/proposal services provide the ability to evaluate recommendations 506 received from ad platform partners 106 responsive to campaign parameters that have been provided by the buyers 302. The services 402 also enable the ability to automatically approve and submit proposals 508 by the buyers 302 and ad platforms 106. The services 402 provide for visibility for holistic campaign components 510 such as the proposal, campaign, media and creative instructions by both the buyer 302 and add platforms 106. The functionalities of the pre-buy/proposal services 402 further automate the process of Make Goods and UD based on agency guidelines. The pre-buy/proposal services 402 enable the automation of a number of items such as pre-buy in proposal revisions 514, inventory availability checks 516, pricing analysis 518 and calculation of clearance probability 520. The services 402 further enable the integration of the order management system for process automation 522 and the integration of customer relationship management systems for process automation 524.

The described pre-buy/proposal services provide a number of advantages for both agency and advertiser buyers 102 and ad platforms 106. With respect to agencies and advertisers, the sales gateway 102 and the above described services eliminate the need for time-consuming phone calls and emails between buyers 302 and ad platforms 106 during the pre-buy activities. The services 402 reduce the cycle time for campaign deliveries. The response functionalities provide near real-time feedback on provided campaign goals and provide for automated recommendations for adjustments based upon the received campaign goals. This enables buyers to receive a clear understanding of potential campaign success. The buyers can communicate both the Make Goods and Under Delivery guidelines. The buyers can also have a single source for all campaign components such as proposal, media and creative instructions and streamline the process for revisions of campaign components.

The automation of inventory availability checks and pricing analysis. The ability to calculate clearance probability. The ability to provide feedback for overall campaign success. The automation of recommendations based on campaign goals and the automation of processing of Make Goods and Under Delivery Bonus based on preset campaign guidelines. Finally, pre-buy/proposal services 405 provide for the integration with CRM, OMS, inventory and pricing management systems to streamline the overall pre-buy workflow.

Figure 7A:
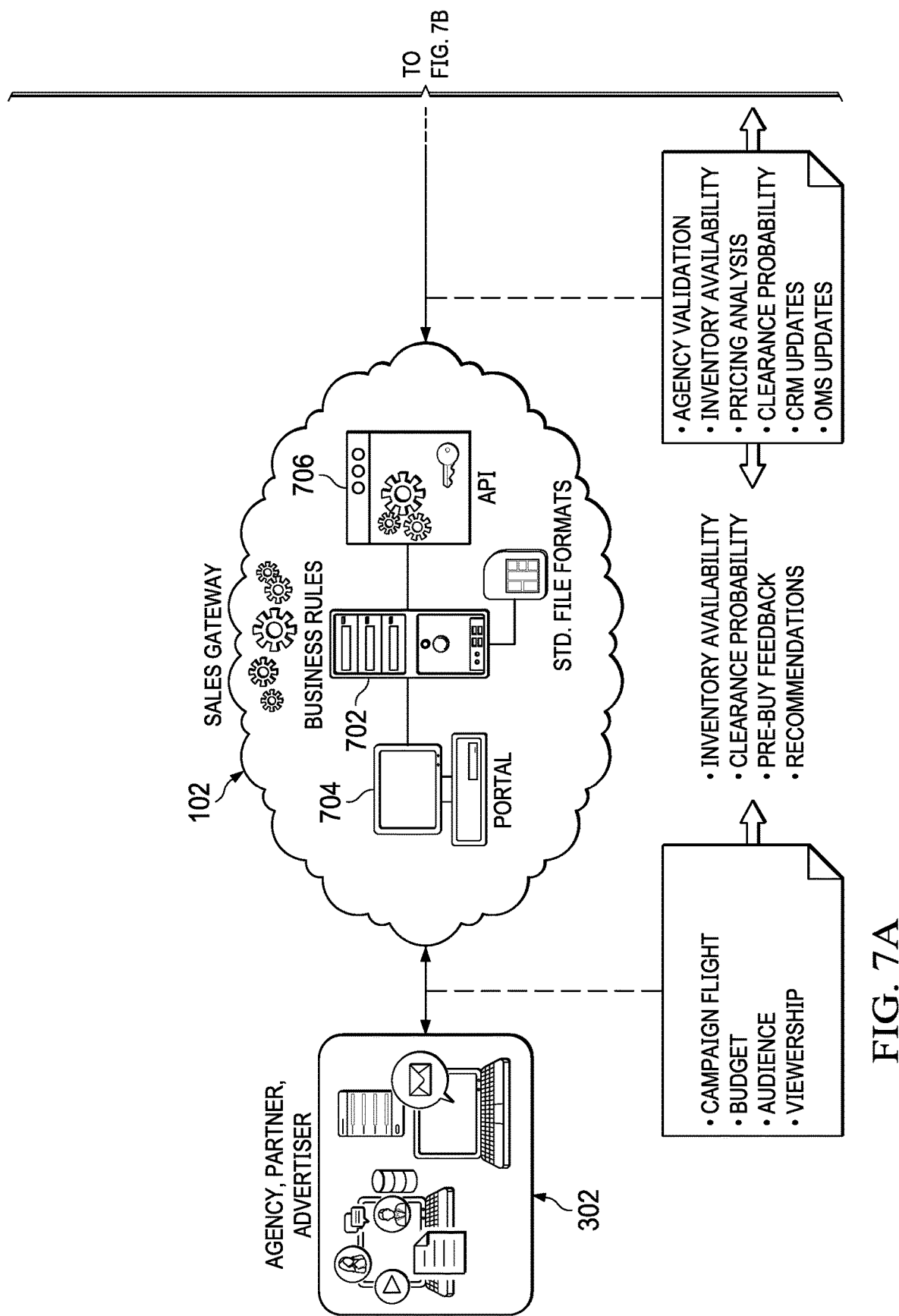
FIGS. 7A and 7B illustrate the various processes provided by the Media Services.
Figure 7B:
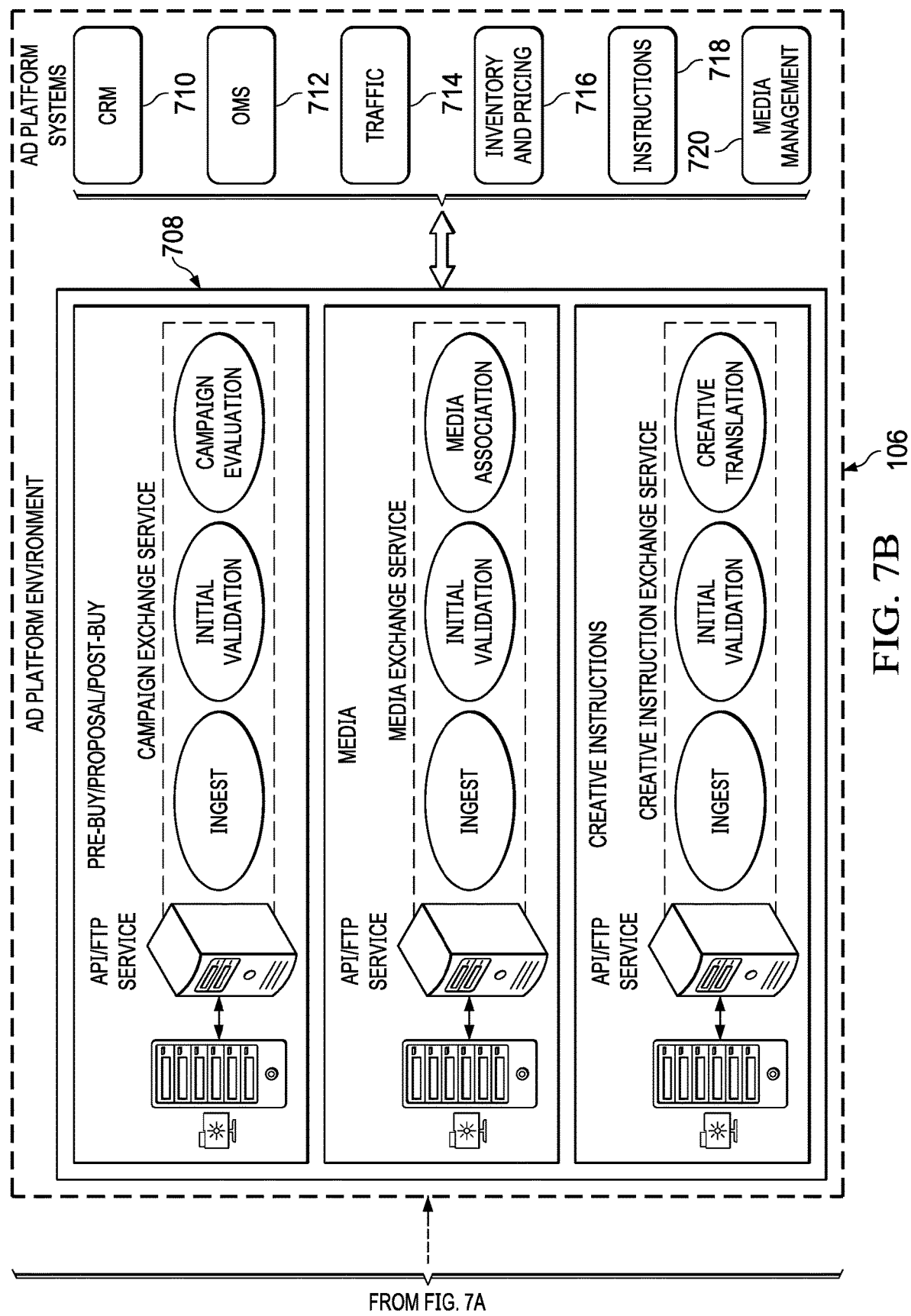

Referring now to FIGS. 7A and 7B, there is illustrated the interaction between the buyers 302 consisting of the agencies, partners and advertisers, the sales gateway 102 and the ad platform 106 with respect to the pre-buy/proposal services 402 and post buy services 408. The sales gateway 102 includes an established set of business rules 702 for enabling the interactions between the buyers 302 and ad platforms 106 stored in standard file formats. Interactions with the buyers 302 occur through portal 704 interactions with the ad platform 106 and occur substantially through an API 706. The ad platforms consist of the ad management system 708 such as that described in U.S. Pat. No. 10,645,435, entitled AD MEDIA MANAGEMENT SYSTEM, filed on Sep. 4, 2019, which is incorporated herein by reference. However, it should be appreciated that other types of ad management systems may be used. The Sales Gateway functions with a variety of system types. The ad management system 708 interconnects with various ad platform systems including CRM (customer relationship management) 710, OMS (order management system) 712, traffic 714, inventory and pricing 716, instructions 718 and media management 720. The interface between the sales gateway 102 and the buyers 302 enable the provision of information relating to campaign parameters such as a campaign flight, a budget, a desired audience, and desired viewership. The interface between the sales gateway 102 and the ad platform 106 enables the provision of information such as agency validation, inventory availability, pricing analysis, clearance probability, CRM updates and OMS updates. This information may be used by the sales gateway to generate information relating to inventory availability, clearance probability, pre-by feedback and various campaign recommendations.

Figure 8:
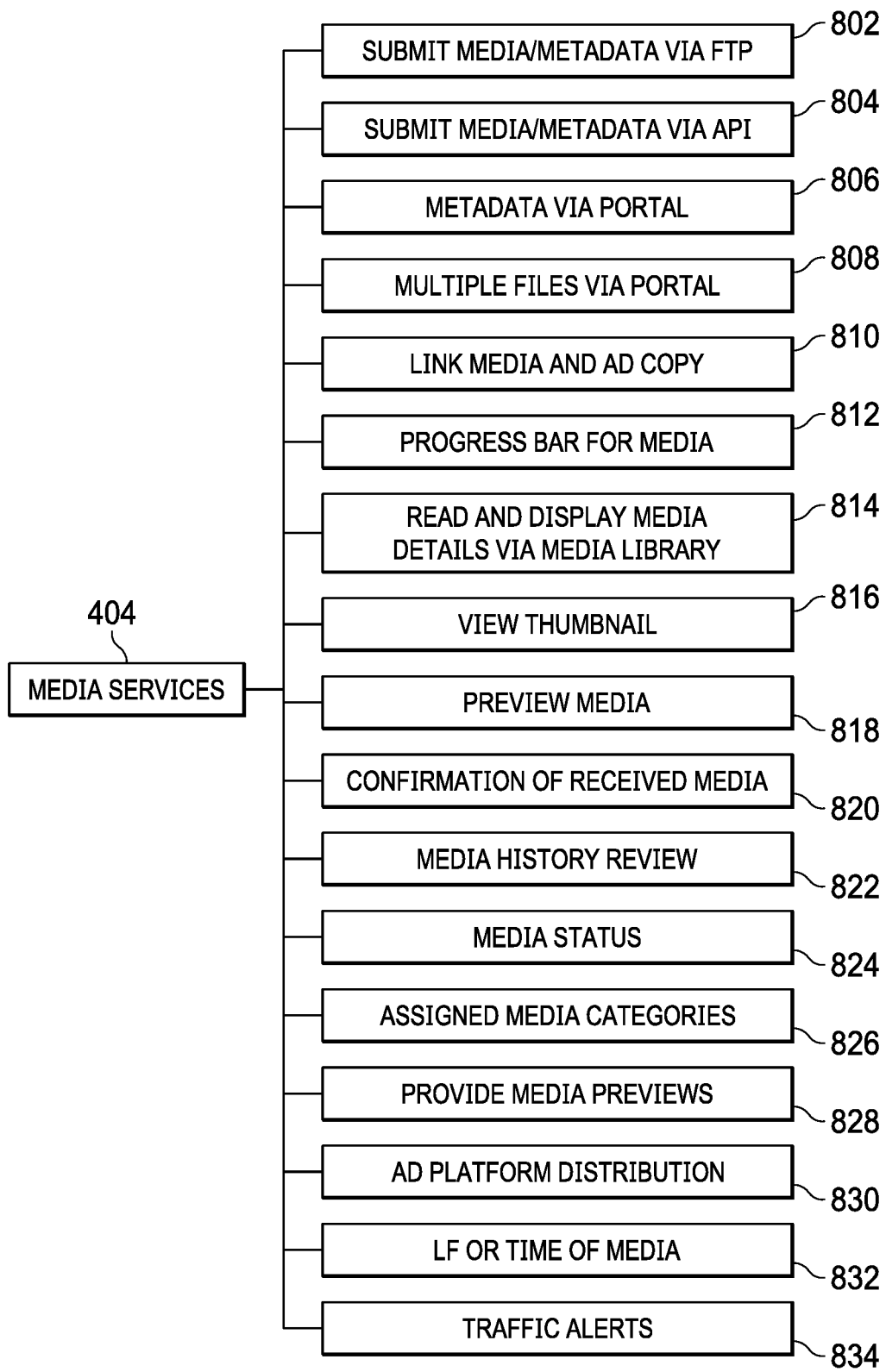
FIG. 8 illustrates the operation of the Media Services within the system.

Referring now to FIG. 8, there is provided a more detailed illustration of the various functionalities provided by the media services 404 of the sales gateway 102. The media services 404 enable buyers or representative of the buyers to upload media (commercials) from the buyers 302 to the ad platforms 106 if they have an approved AOP link for media services. The Sales Gateway 102 provides the ability to link provided media to creative instructions and/or a campaign that has been stored within the sales gateway 102 or within the operational systems of the ad platform 106.

The media services 404 of the sales gateway 102 provide a number of different functionalities that are useful during the media buying process as described hereinabove. The functionalities enable both media and metadata (XML) to be submitted via FTP 802 and via an application program interface (API) 804. The media services 404 further allow metadata to be entered via the sales gateway portal 806. Functionalities enable the upload of multiple files at once through the sales gateway portal 808. The media services 404 provide the ability to link media to ad copy or vice versa 810. A progress bar 812 is provided for each piece of media to monitor its processing progress. Media details may also be read and displayed 814 via a media library. The functionalities further enable the viewing of media via a thumbnail 816 or the preview of media 818. The media that is received into the ad platform's Media Management System (MMS) may also be confirmed 820. The media services 404 enable a user to view the entire history for all media that has been uploaded 822, view the media status 824 and see the categories assigned to the media 826. Low-res media previews 828 are provided via download or email. The media services 404 further enables the distribution of media to multiple ad platforms 830 via a secure AOP link. LongForm (LF) media or media needing to be trimmed may also be determined using functionality 832. The media services 404 also provide the ability to convert media into the format required by the ad platforms or to send traffic alerts 834 to ad platforms 106 to pull media from the air or inform an ad platform of revised media pending.

The described media services 404 provide a number of advantages for both agency and advertiser buyers 102 and ad platforms 106. With respect to agencies and advertisers, the sales gateway 102 provides a single source for media management, insight and distribution of media for agencies and advertisers. The media services 404 enable ease of distribution of media to various or all ad platform environments through the use of the service gateway exchange AOP link management. Media services 404 provides three flexible methods for uploading media content which supports small, medium and large agencies and advertisers through the use of the API, XML and direct upload through the portal. The media services further enable the ability to link media to ad copy instructions in advance of submission enabling for advanced workflow for sweeps and political content. The services further provide real-time media status enabling agencies and advertisers to remedy issues in a timely fashion.

Advantages provided to ad platforms 106 by the media services 404 include timely receipt of media, timely media triage and remedy of media with issues, and auto association for media linked to ad copy. The real-time media status provided by the media services 404 lessens the amount of requested inquiries to the ad platform 106. Additionally, the media services 404 provide streamlined agency/advertiser alerts related to the media to be generated and streamlined sweeps and political auto associations with the sales gateway workflow. The media services 404 provide a single source for fulfillment of media and ad copy submitted to the sales gateway 102. Finally, download requests are streamlined by auto validation and vulnerability checks.

Figure 9B:
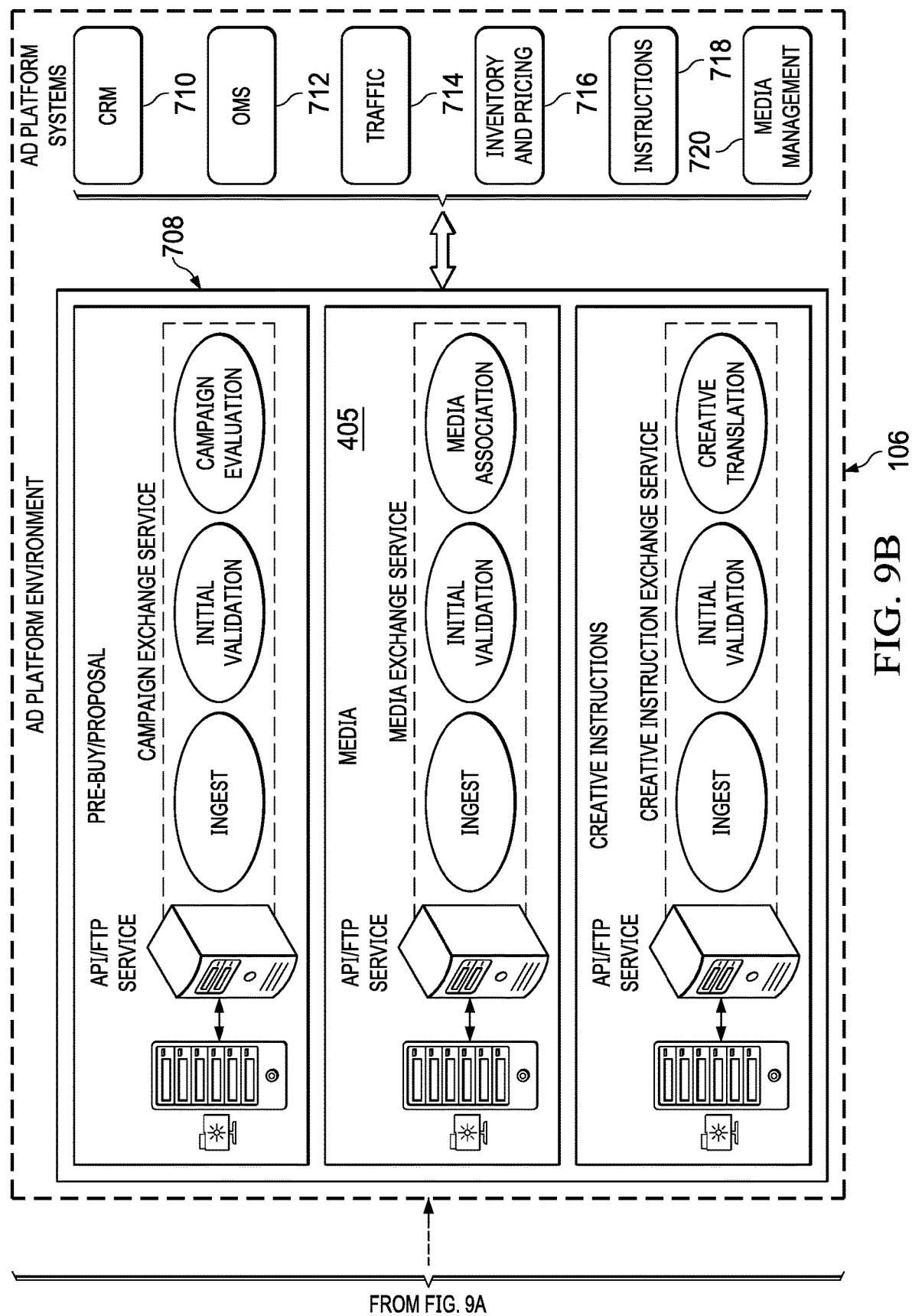

Referring now to FIGS. 9A and 9B, there are illustrated the interaction between the buyers 302 consisting of the agencies, partners and advertisers, the sales gateway 102 and the ad platform 106 with respect to the media services 405. The structures of the buyers 302, sales gateway 102 and ad platform 106 are the same as that described hereinabove with respect to FIG. 7. The buyers 102 can provide XML metadata, uploads to the API and portal media uploads to the sales gateway 102. The ad platform 106 may provide to the gateway 102 XML metadata, media file distribution, media file status, alert notifications and auto ad copy association. This enables the sales gateway 1022 provide a media library, multi-ad platform distribution and converge media management exchange.

Figure 10:
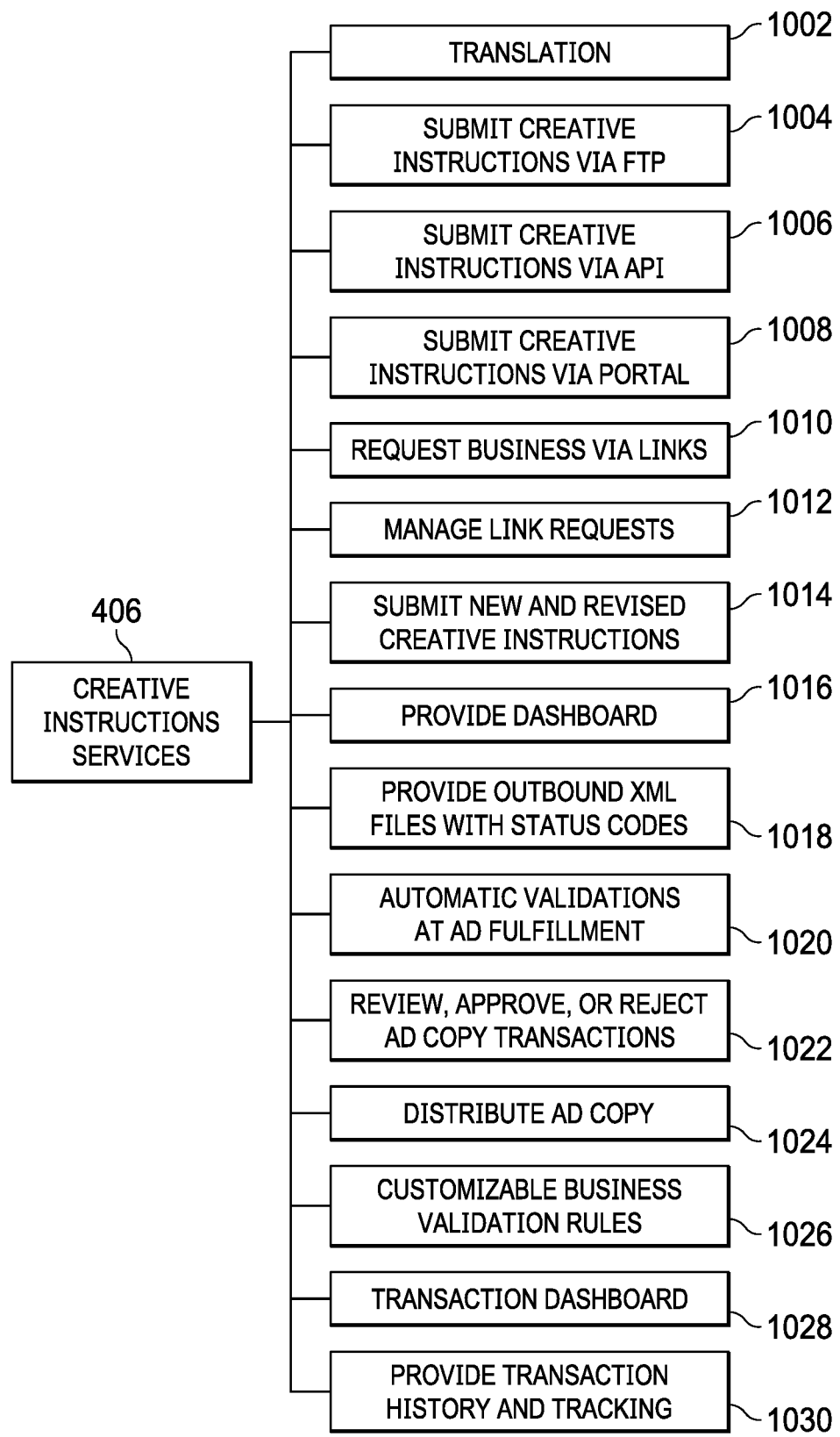
FIG. 10 illustrates the operation of the Creative Instruction Services within the system.

Referring now to FIG. 10, there is provided a detailed illustration of the various functionalities provided by the creative instruction services 406 of the sales gateway 102. The creative instruction services 406 enable agencies to send creative instructions (ad copy instructions, traffic instructions) to ad platforms 106 in an automated fashion to enable the agencies to know how to run received commercials (media). The creative instructions services 406 provide a translation 1002 between the material sent/provided by the buyers 302 to the material sent to the ad platform 106. The material is sent to the ad platform 106 in three different fashions.

As shown in FIG. 11, using portal 308, a buyer 302 can login at step 1102 to the portal. The buyer selects at step 1104 the ad platform(s) 106 to which they want to send information. The buyer enters—instructions at step 1106 related to the media and sends the information and instructions at step 1108 to the selected ad platforms 106.

Referring now to FIG. 12, the portal 308 also allows the uploading of buyer instructions. In this case, the buyer 302 logs into the portal at step 1202. The buyer selects the ad platform 106 to send the instructions to at step 1204. The instructions are uploaded at step 1206 as an Excel, PDF, Word or other supported document format that contains the instructions. The instructions are translated (mapped) into a required format at step 1208, and an instruction form is auto-populated at step 1210 based on the translated instructions. The instructions form may then be submitted at step 1212 to the ad platform 106.

Referring now to FIG. 13, there is illustrated the manner in which the file transfer protocol (FTP) may be used for providing creative instructions. The buyer 302 can upload at step 1302 a standard file format or other document (XML, Excel, PDF, Word, etc.). The sales gateway 102 authenticates the sender at step 1304 and maps (translates) the file at step 1306 into the necessary format. The translated file is transmitted to the ad platform 106 at step 1308.

Referring now to FIG. 14, there is shown the use of the application program interface (API) 1402 for providing creative instructions. The buyer 302 can integrate their buying software 1404 into the sales gateway 102 cloud services and automatically distribute creative instructions 1406 via an approved API standard.

Referring now back to FIG. 10, the creative instruction services 406 enable the submission of creative instructions via the FTP 1004 and application program interface 1006. The creative instruction services 406 further allows creative instructions to be entered or submitted via the sales gateway portal 1008. Services 406 further enable buyers 302 with the ability to request to do business 1010 with the ad fulfillment environments via a secure AOP link. The creative instructions services 406 enable the management of link requests (AOP link requests) 1012. Using the creative instructions services 406 enable the submission of new and revised creative instructions 1014.

A dashboard 1016 is provided by the creative instruction services 406 for buyers to enable the provision and reception of the creative instructions. Outbound XML files with status codes 1018 are provided to allow agencies and advertisers to leverage their own internal dashboards. The creative instructions services 406 provide automatic validations 1020 required by Ad Platform fulfillment for the submitted creative instructions. Ad Platforms using ad fulfillment review within the creative instruction services 406, ad copy transactions may be reviewed, approved or rejected 1022 within the agency queue. Creative instruction services 406 further provide the ability to distribute ad copy to multiple Ad Platform fulfillment environments 1024 via the AOP link. Creative instruction services 406 enable customizable validation business rules at ad fulfillment 1026. Ad fulfillment 1026 is provided a transaction dashboard to reference all ad copy received, validated, approved or denied with specific error coding and handling 1028. Finally, the services 406 provide for transaction history and tracking 1030.

The creative instruction services 406 provide a number of benefits to users and buyers. These include providing electronic submission of creative instructions to include revisions. This eliminates manual entry, potential errors and lost revenue. Ad copy may be easily distributed to various or all ad fulfillment environments with the use of AOP link management. Three flexible methods for uploading ad copy support small, medium and large agencies and advertisers using the API, XML or direct uploads through the Sales Gateway portal. Creative instruction services 406 allow real-time ad copy status allowing agencies and advertisers to remedy issues in a timely manner. The services also provide the ability to allow or deny modifications for ad spot start dates and other parameters at ad fulfillment to provide the earliest play out of ad copy.

The electronic receipt of creative instructions including revisions eliminates the manual entry of instructions and potential errors arising therefrom. The services automate ad copy workflow and significantly reduces human intervention. Customizable validation business rules steward electronic ad copy workflow and allows focus on problem transactions. The creative instruction services 406 provide for configurable auto approval or review of the workflow. They further provide for real-time updates to agencies and advertisers on creative instructions which lessen the need to contact the Ad Platform. The services 406 allow for receipt of ad copy transactions to be placed into a "pending" status if an order has not been received or approved and automatically process the transaction once approval is received. The services 406 provide for enhanced error handling providing ad fulfillment specific information about transactions requiring intervention.

Figure 15A:
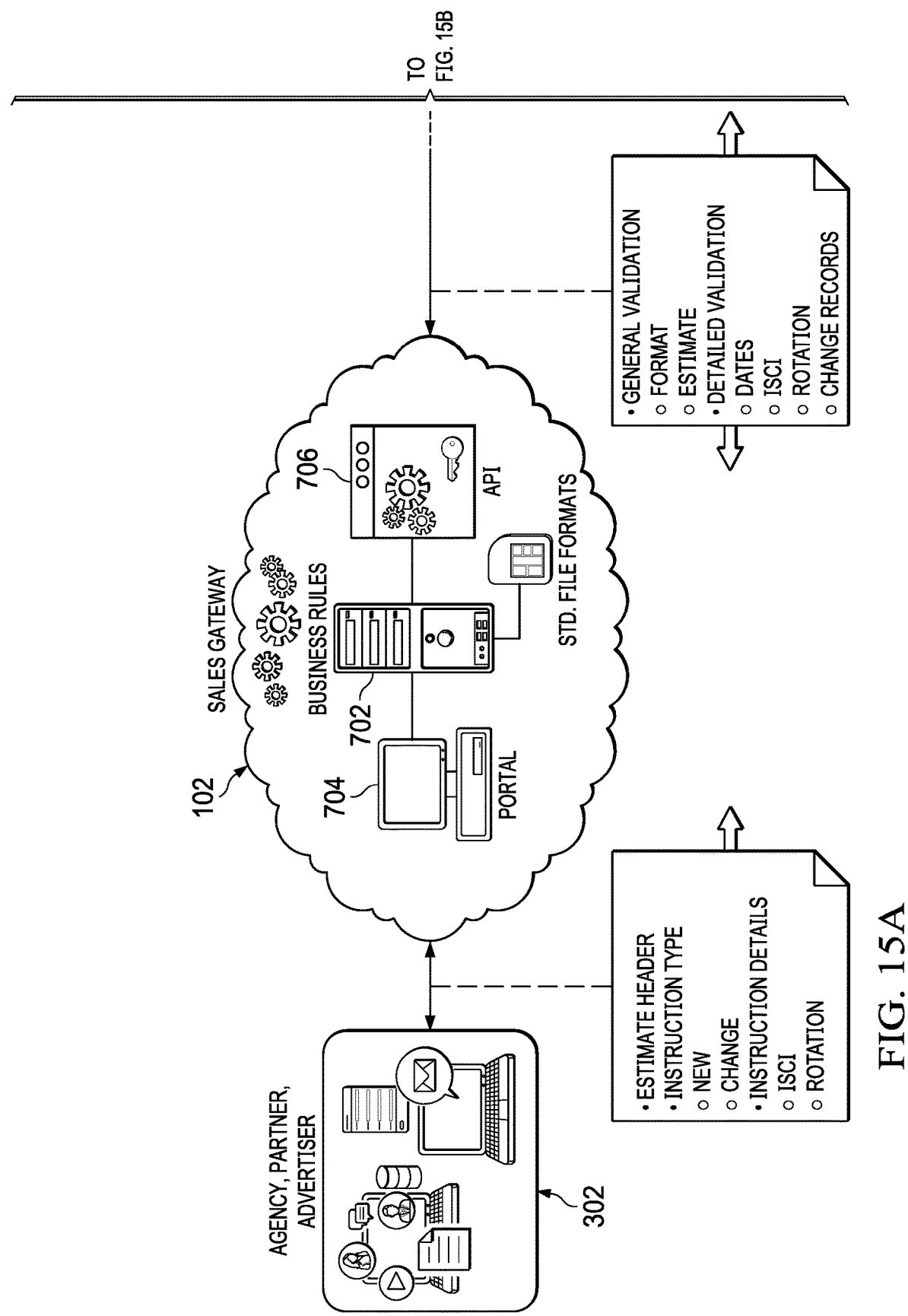
FIGS. 15A and 15B illustrate interaction between buyers, a sales gateway and an ad platform.
Figure 15B:
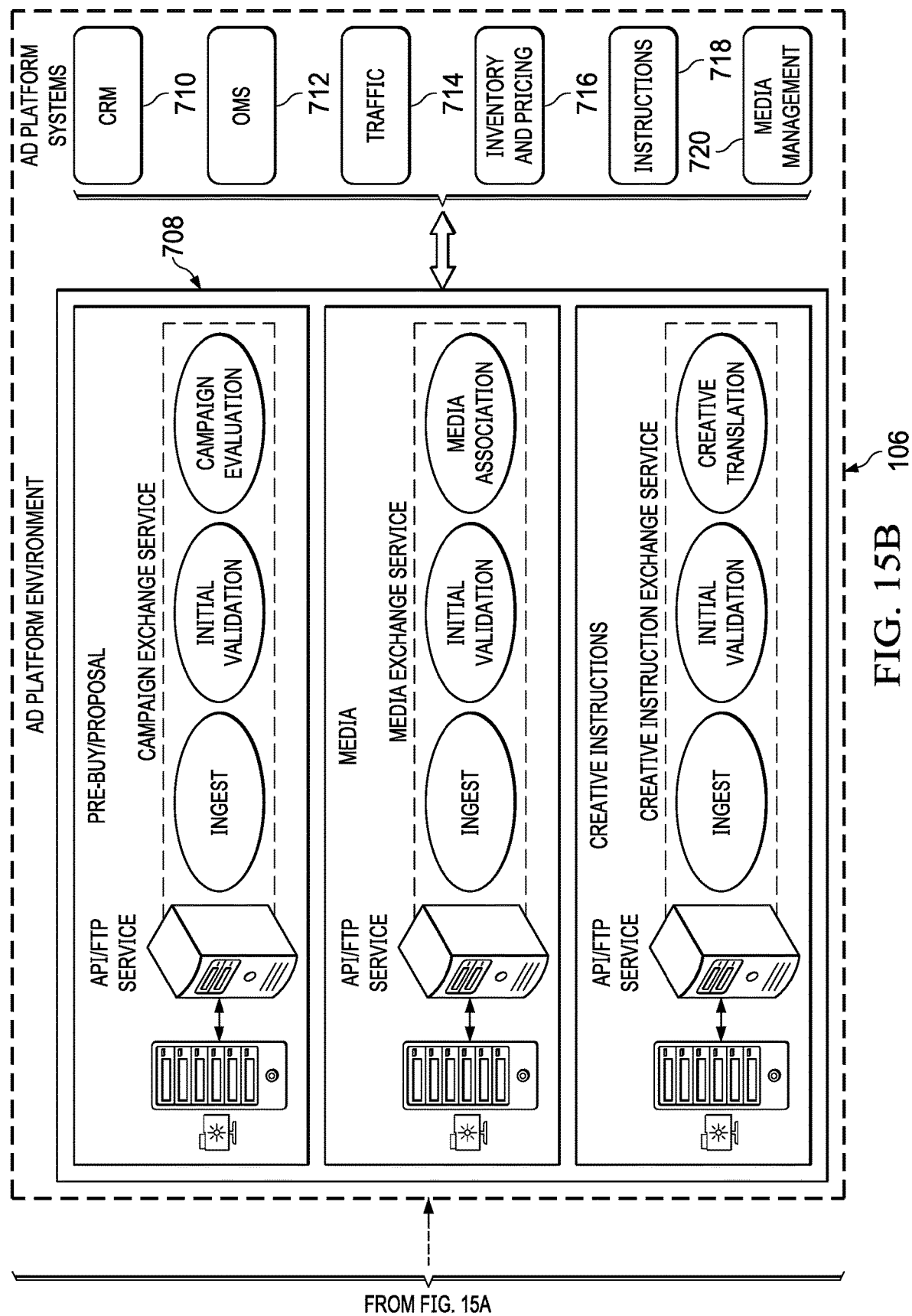

Referring now to FIGS. 15A and 15B, there are illustrated the interaction between the buyers 302 consisting of the agencies, partners and advertisers, the sales gateway 102 and the ad platform 106 with respect to the creative instruction services 406. The structures of the buyers 302, sales gateway 102 and ad platform 106 are the same as that described hereinabove with respect to FIG. 7. The buyers 102 can provide an estimated header, and instruction type (either new or changed) and instruction details (ISCI, rotation) to the sales gateway 102. The ad platform 106 may provide to the gateway 102 general validation (format, estimate) and detailed validation (dates, ISCI, rotation, change records. This enables the sales gateway 102 to provide a media library, multi-ad platform distribution and converge media management exchange.

Referring now to FIG. 16-20, there are more particularly illustrated the user interfaces for providing the functionalities of the sales gateway discussed hereinabove. Referring now to FIGS. 16A-16B, there is illustrated the summary page 1602 of the sales gateway 102. The summary page 1602 displays a list of media transaction files that are provided to ad platforms 106. Each row is associated with a separate transaction based upon a request by a buyer that is provided to the ad platforms 106. The default order for the listed transactions are in the date response sent order and transactions that are awaiting a response and do not have a response date will appear first within the summary. The action column 1604 enables display of the proposal, media and ad copy by clicking on a button that is associated with a particular transaction. The agency name column 1606 lists the agency associated with the AOP link ID used in the transaction file. The advertiser name column 1608 defines the name of the advertiser from the transaction file. The order # column 1610 includes the order number if included in the transaction file. The client CD column 1612 provides the client code if included with the transaction file. The product CD column 1614 provides the product code if included within the transaction file. The estimate ID column 1616 provide the advertising agencies estimate number and is used to map the instructions to the order when it arrives at the advertising platforms 106. The AOP column 1618 indicates the advertising platform environment to which a file was sent. The start date column 1620 indicates the first air date of the scheduled media, and the end date a column 1622 indicates the last air date of the scheduled media. The last received column 1624 indicates the last date and time a file related to the estimate number was received by the sales gateway. The date received column 1626 indicates the dates and time the original file related to the estimate number was received by the sales gateway. The day response sent column 1628 indicates the date and time the sales gateway last responded via the outbound XML to a file received.

By clicking on the Creative Instructions icon 1630 within the summary page 1602, the ad copy transaction roll-up report 1702 is displayed as shown in FIGS. 17A and 17B. All transactions related to a single estimate are displayed in the transaction roll-up report 1702. By clicking on the plus sign icon 1704, a more detailed view of individual instruction details can be viewed including the fields shown in FIG. 17C. The Advertiser field 1706 indicates the advertiser name from the transaction file. The Order # field 1708 provides the buyer order number if included in the transaction file. The Estimate ID field 1710 indicates the buyer's estimate ID and is used for mapping the instruction to the order when it arrives at the advertising platform 106. The AOP field 1712 indicates the advertising platform environment to which a file was sent. The flight start field 1714 indicates the start date of order and the flight end field 1716 indicates the end date of an order.

The transaction ID column 1718 is a field that the agency or advertiser can use to input its own unique identifier for the transaction file. The sales gateway transaction ID column 1720 is the sales gateway unique identifier for the individual transaction file assigned by the sales gateway after receipt of a file. The Trans Date column 1722 indicates the original submission date of the original file. The Status field 1724 indicates the success or error of the transaction. The type field 1726 indicates whether the transaction is new or a change to an existing transaction. The length field 1728 indicates the length of the copy or media associated with the transaction. The zones field 1730 indicates the zones include with a file. The item type field 1732 indicates whether the item is original, changed or added. The bookend ID column 1734 provides the unique ID for the creative book and group. The bookend Seq field 1736 provides the order in which each piece of copy should be one in the bookend pairing. The start column 1738 provides the first air date of the schedule, and end column 1740 provides the last air date of the schedule. The creative name column 1742 provides the name of the piece of copy. ICSI column 1744 provides the ICSI Code associated with the piece of copy. The rotation type column 1746 indicates a P for percentage and no value is provided for even. The rotation value 1748 indicates the percentage or ratio of rotation to be assigned to a piece of copy. The first day start column 1750 and last day start column 1752 indicates the time of day that a spot should start on the first day the spot is scheduled and the time of day the spot should and on the last day the spot is scheduled respectively. The day start time column 1754 indicates the daily start time for which the spot is scheduled, and the days stop time indicate the daily stop time the spot is scheduled for. The day column 1758 indicates the day of the week the spot is to run. The nets column 1760 indicates the networks to be included/excluded for a spot.

The main page of the transaction report (FIG. 16) displays individual transactions. Each transaction has its own line and is not rolled up under a single estimate number. As shown in FIG. 18, the action buttons 1802 enable information with respect to details, XML and transaction history. The agency field 1804 indicates the agency associated with the ad pay link ID can use to input its own unique identifier for the transaction file. The transaction ID 1806 is a field the agency uses in the transaction file. The Gateway system transaction ID 1808 is a unique identifier for the individual transaction file assigned by the sales gateway during receipt of the file. The status field 1810 provides the current status of the file in the workflow. The advertiser name field 1812 indicates the advertiser name associated with transaction file. The order number field 1814 indicates the agency order number associated with the transaction file. The client CD 1816 indicates the agency client code if included in the transaction file. The product CD 1818 indicates the agency product code if included with the transaction file. The estimate ID 1820 indicates the agency's estimate number and is used for mapping the instructions to an order when it arrives at the advertising platforms. The syscode field 1822 indicates the syscodes/zones included in the transaction file. The start date field 1824 indicates the flight start date and the end date 1826 indicates the flight end date. The AOP field 1528 indicates the ad platform environment to which a file is sent. The service field 1830 indicates either ad copy, media or proposal. The receive field 1832 indicates the date and time the specific transaction file was received. The process field 1834 indicate the date and time the specific transaction file was processed. The responded field 1836 indicate the date and time the sales gateway sent a response via the outbound XML back to the buyer. The last updated field 1838 indicate the last date and time there was an update related to the specific transaction file.

Actuating the binoculars icon 1632 (FIG. 16) actuates the details button providing specific details for individual transactions. By clicking on the icon 1632, the following information as shown in FIG. 19 may be provided. The details page displays the transaction details associated with ad copy instructions sent in a single file including changes and additions. The advertiser field 1902 indicates the advertiser name on the transaction file. Order number field 1904 indicates the agency order number included in the transaction file. The estimated ID field 1906 indicates the agency's estimate number and is used to map the instruction to the order when it arrives at the advertising platform. The AOP field 1908 indicates the advertising platform environment to which the transaction file was sent. The flight start time 1910 indicates the flight start date, and the flight end field 1912 indicates the flight end date.

Various page columns include the transaction ID column 1914 where the agency or advertiser can input its own unique identifier for a transaction file. The sales gate transaction ID column 1916 may receive these sales gateway ID unique identifier for the individual transaction file assigned by the sales gateway during receipt of the file. The trans-date column 1918 indicates the original submission date of the original file. The status column 1920 indicates whether the transaction was a success or an error. The type column 1922 indicates whether the transaction comprises a new instruction or a change order. The link column 1924 indicates the links of the copy media. Syscode column 1926 are for the syscodes/zones included in the transaction file. The item type column 1928 may indicate original, changed, add (original instruction, changes received in a change order to existing instruction or added to an instruction via a change order). The bookend ID column 1930 stores you a unique ID for the creative bookend group. The bookend seq column 1932 indicates the order in which each piece of copy should be run in the bookend pairing. The start column 1934 and end column 1936 indicate the first air date and last air date of the schedule respectively. The creative name column 1938 indicates the name of the piece of copy. The ISCI column 1940 indicates the ISCI Code associated with a piece of copy. The rotation type column 1942 uses P for percentage or no value for even. The rotation value column 1944 indicates the percentage or ratio of rotation to be assigned to the piece of copy. The first day's start column 1946 and last a start column 1948 indicate the time of day the spot should start on the first day the spot is scheduled and the time of day the spot should end on the last day the spot is scheduled, respectively. The day start time column 1950 indicates the daily start time the spot is scheduled, and the day stop time indicates the daily stop time the spot is scheduled. The day column 1954 indicates the days of the week the spot is to run and the next column 1956 indicate the networks to be included/excluded for running the spots.

Figure 20:
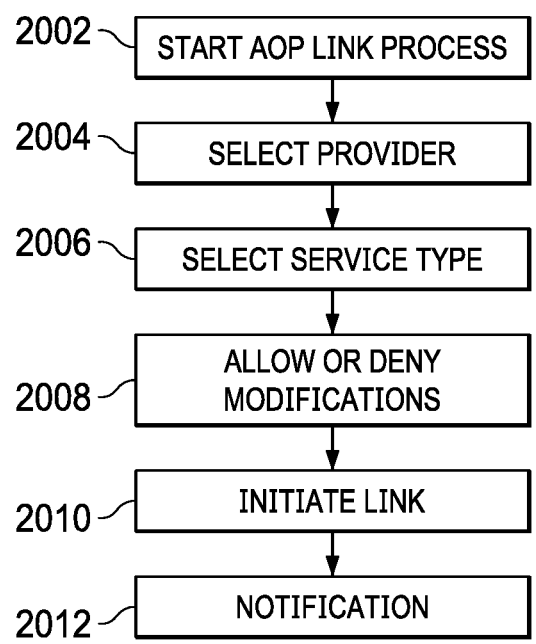
FIG. 20 illustrates a flow chart of a process for initiating an AOP link.

Referring now to FIG. 20, there is illustrated the process for initiating an AOP link. The AOP link process is started at step 2002 by actuating an icon associated with requesting a new AOP ID on the user interface of the sales gateway. The provider from whom the link is being requested is selected at step 2004. The service type being requested is selected at step 2006. The service type may be ad copy, proposals or physical media. Next, the user may choose to allow or deny modifications at step 2008. Modifications are specific to the start date of the instruction. If an instruction is received too close to the deadline and allow modifications has been selected, the sales gateway will automatically shift the start date to accommodate for the ad copy closeout date. If an instruction is received too close to the deadline and deny modifications has been selected, it is possible the instructions may be rejected since they cannot be processed in time to accommodate the start date instruction. Multiple AOP links may be requested in order to allow modifications for some clients and deny modifications for other clients for whom copy instructions are being sent. The AOP link is initiated at step 2010 by clicking on the add AOP link and the notification is sent at step 2012 to the ad platform. Statuses will be indicated as pending until the AOP provider enables (approves) or disables (rejects) the link request.

Actuation of the XML button displays a pop-up with tab views of XML details for both inbound and outbound transaction files. Once the XML icon on a transaction line is actuated there is provided information with respect to inbound XML and outbound XML. Outbound XML comprises data sent in the sales gateway from the buyer. The outbound XML provides validation or error information that is sent from the sales gateway to the buyer. The outbound XML will contain status codes that can be used to understand why files may contain errors.

It will be appreciated by those skilled in the art having the benefit of this disclosure that this system providing a sales gateway between agencies and advertisers to ad platforms provides an unimproved manner for controlling the process of buyers purchasing advertising media and scheduling advertising media for play upon a broadcast television, cable television, radio, or other type of broadcast network. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A system for providing centralize control of an advertising campaign between advertising buyers that purchase advertising space for display on a network and advertising platforms that provide purchased advertising to consumers, comprising:

a first interface for providing a connection to at least one advertising buyer that purchases the advertising space for display on the network;

a second interface for providing a second connection to at least one advertising platform that provides the purchased advertising to the consumers;

a server coupled to the first and second interfaces for implementing a sales gateway for providing centralized control of the advertising campaign between the at least one advertising buyer and the at least one advertising platform responsive to a stored set of instructions;

a memory coupled to the server, the memory having the stored set of instructions for implementing the sales gateway, the stored set of instructions configuring the server to:

generate a connection link to enable control of the advertising campaign between the at least one advertising buyer and the at least one advertising platform by the sales gateway over the connection link responsive to a request;

validate information relating to a campaign proposal received from the at least one advertising buyer over the first interface associated with the advertising campaign and submit the campaign proposal received from the at least one advertising buyer to the at least one advertising platform via the second interface over the connection link using a pre-buy/proposal service of the sales gateway;

transfer media content received from the at least one advertising buyer associated with the advertising campaign from the at least one advertising buyer to the at least one advertising platform via the second interface over the connection link through the sales gateway using a media service of the sales gateway;

submit creative instructions received from the at least one advertising buyer over the first interface associated with the advertising campaign for running the media content transferred to the at least one advertising platform on the at least one advertising platform from the at least one advertising buyer to the at least one advertising platform via the second interface over the connection link through the sales gateway using a creative instructions service of the sales gateway, wherein the stored set of instructions further configures the server as part of a submission of the creative instructions to:

receive the creative instructions for running the media content from the at least one advertising buyer via the first interface over the connection link at the sales gateway in a first format;

translate the creative instructions for running the media content into a second format at the sales gateway;

transmit the creative instructions for running the media content in the second format from the sales gateway to the at least one advertising platform via the second interface over the connection link; and submit campaign performance results associated with the running of the media content in accordance with the creative instructions from the advertising platform via the second interface to the at least one advertising buyer via the first interface over the connection link through the sales gateway using a post buy service of the sales gateway.

2. The system of claim 1, wherein the stored set of instructions further configure the server to automatically translate the creative instructions into the second format responsive to receipt of the creative instructions in the first format.

3. The system of claim 1, wherein the stored set of instructions further configure the server to transmit creative instructions received from the at least one advertising buyer to a predetermined advertising platform over the connection link through the sales gateway responsive to a selection of the at least one advertising buyer and a creative instruction entry.

4. The system of claim 3, wherein the stored set of instructions further configure the server to translate the creative instruction entry from a received file format, populate a creative instructions form using the translated creative instruction entry and transmit the creative instructions form to the predetermined advertising platform from the sales gateway over the connection link.

5. The system of claim 1, wherein the stored set of instructions further configure the server to receive a standard format file from an advertising buyer, authenticate the advertising buyer, translate the standard format file to a format useable by an advertising platform and transmit the translated file to the advertising platform from the sales gateway over the connection link.

6. The system of claim 1, wherein the stored set of instructions further configure the server to transmit the creative instructions to the at least one advertising platform from the sales gateway over the connection link using a predetermined XML standard responsive to receipt of the creative instructions from the at least one advertising buyer.

7. The system of claim 1, wherein the stored set of instructions further configure the server to receive campaign data from the at least one advertising buyer and request a report regarding a potential success of a campaign based on the campaign data from the at least one advertising platform.

8. The system of claim 1, wherein the stored set of instructions further configure the server to transmit a campaign proposal to an advertising platform from the sales gateway over the connection link responsive to an indication of agreement to the campaign proposal by each of an advertising buyer providing the campaign proposal and the advertising platform receiving the campaign proposal.

9. The system of claim 1, wherein the stored set of instructions further configure the server to upload media files from the at least one advertising buyer to the at least one advertising platform over the connection link through the sales gateway if the connection link has been provided to the at least one advertising platform.

10. The system of claim 9, wherein the stored set of instructions further configure the server to link the uploaded media files to at least one of creative instructions for the media files and to a media campaign associate with the media files.

11. The system of claim 1, wherein the stored set of instructions configure the server to provide performance information to the at least one advertising buyer from the server over the connection link indicating how a campaign is running on the at least one advertising platform.

12. A method for providing centralized control of an advertising campaign between advertising buyers that purchase advertising space for display on a network and advertising platforms that provide purchased advertising to consumers through a sales gateway, comprising:

providing a connection to at least one advertising buyer that purchases the advertising space for display on the network through a first interface from the sales gateway;

providing a second connection to at least one advertising platform that provides the purchased advertising to the consumers through a second interface from the sales gateway;

generating a connection link to enable control of the advertising campaign between the at least one advertising buyer and the at least one advertising platform by the sales gateway over the connection link responsive to a user request;

validating information relating to a campaign proposal received from the at least one advertising buyer over the first interface associated with the advertising campaign;

submitting the campaign proposal received from the at least one advertising buyer to the at least one advertising platform via the second interface over the connection link using a pre-buy/proposal service of the sales gateway;

transferring media content received from the at least one advertising buyer associated with the advertising campaign from the at least one advertising buyer to the at least one advertising platform via the second interface over the connection link through the sales gateway using a media service of the sales gateway;

submitting creative instructions received from the at least one advertising buyer over the first interface associated with the advertising campaign for running the media content on the at least one advertising platform from the at least one advertising buyer to the at least one advertising platform via the second interface over the connection link through the sales gateway using a creative instructions service of the sales gateway, wherein the step of submitting creative instructions further comprises:
  receiving the creative instructions for running the media content from the at least one advertising buyer via the first interface over the connection link at the sales gateway in a first format;
  translating the creative instructions for running the media content into a second format at the sales gateway;
  transmitting the creative instructions for running the media content in the second format from the sales gateway to the at least one advertising platform via the second interface over the connection link; and
  submitting campaign performance results associated with the running of the media content in accordance with the creative instructions from the advertising platform via the second interface to the at least one advertising buyer via the first interface over the connection link through the sales gateway using a post buy service of the sales gateway.

13. The method of claim 12 further comprising translating the creative instructions into the second format by the sales gateway responsive to receipt of the creative instructions in the first format.

14. The method of claim 12, wherein the step of submitting creative instructions further comprises
  receiving a selection of an advertising platform over the connection link at the sales gateway from the at least one advertising buyer;
  receiving entry of a creative instruction over the connection link at the sales gateway from the at least one advertising buyer; and
  transmitting creative instructions received from the at least one advertising buyer to the advertising platform over the connection link through the sales gateway responsive to a selection of the at least one advertising buyer and the creative instruction entry.

15. The method of claim 14, wherein the step of submitting creative instructions further comprises:
  receiving a creative instruction entry in a file format over the connection link at the sales gateway from the at least one advertising buyer;
  translating the creative instruction entry from the file format at the sales gateway;
  populating a creative instructions form with information from the translated creative instruction entry at the sales gateway; and
  transmitting the creative instructions form to the selected advertising platform over the connection link from the sales gateway.

16. The method of claim 12, wherein the step of submitting creative instructions further comprises:
  receiving standard format file including creative instructions from an advertising buyer at the sales gateway over the connection link;
  authenticate the advertising buyer who sent the standard format file at the sales gateway;
  translating at the sales gateway the standard format file to a format useable by an advertising platform; and
  transmitting the translated file to the advertising platform over the connection link from the sales gateway.

17. The method of claim 12, wherein the step of submitting creative instructions further comprises transmitting the creative instructions to the at least one advertising platform over the connection link from the sales gateway using a predetermined XML standard responsive to receipt of the creative instructions from the at least one advertising buyer.

18. The method of claim 12, wherein the step of submitting campaign performance results further comprises:
  receiving campaign data from the at least one advertising buyer over the connection link at the sales gateway; and
  requesting a report regarding a potential success of a campaign based on the campaign data from the at least one advertising platform over the connection link from the sales gateway.

19. The method of claim 12, further comprising transmitting a campaign proposal to an advertising platform over the connection link from the sales gateway responsive to an indication of agreement to the campaign proposal by each of an advertising buyer providing the campaign proposal and the advertising platform receiving the campaign proposal.

20. The method of claim 12, wherein the step of transferring media content further comprises uploading media files from the at least one advertising buyer to the at least one advertising platform over the connection link through the sales gateway if the connection link has been provided to the at least one advertising platform.

21. The method of claim 20 further comprises linking the uploaded media files to at least one of creative instructions for the media files and to a media campaign associated with the media files.

22. The method of claim 12, wherein the step of submitting campaign performance results further comprises providing performance information to the at least one advertising buyer indicating how a campaign is running on the at least one advertising platform over the connection link from the sales gateway.

23. A system for providing centralized control of an advertising campaign between advertising buyers that purchase advertising space for display on a network and advertising platforms that provide purchased advertising to consumers, comprising:
  a first interface for providing a connection to at least one advertising buyer that purchases the advertising space for display on the network;
  a second interface for providing a second connection to at least one advertising platform that provides the purchased advertising to the consumers;
  a server coupled to the first and second interfaces for implementing an advertising media management system for providing centralize control of the advertising campaign between the at least one advertising buyer and the at least one advertising platform responsive to a stored set of instructions;
  a memory coupled to the server, the memory having data and the stored set of instructions for implementing the advertising media management system, the data including advertising inventory data, the set of instructions configuring the server to provide:
    a pre-buy/proposal function for validating information relating to a campaign proposal received from the at least one advertising buyer associated with the advertising campaign over the first interface and submitting the campaign proposal received from the at least one advertising buyer to the at least one advertising platform via the second interface;
    a media service function for transferring media content received from the at least one advertising buyer via the first interface related to the advertising campaign from the at least one advertising buyer to the at least one advertising platform via the second interface through the advertising media management system;

a creative instructions function for submitting creative instructions received from the at least one advertising buyer via the first interface related to the advertising campaign for running the media content transferred to the at least one advertising platform via the second interface on the at least one advertising platform from the at least one advertising buyer to the at least one advertising platform through the advertising media management system, wherein the creative instructions function receives the creative instructions for running the media content from the at least one advertising buyer via the first interface in a first format, translates the creative instructions for running the media content into a second format and transmits the creative instructions for running the media content in the second format to the at least one advertising platform from the advertising media management system via the second interface;

a post buy service function for submitting campaign performance results related to the running of the media content in accordance with the creative instructions from the advertising platform to the at least one advertising buyer through the advertising media management system via the first interface; and a connection link controller for generating a connection link to at least one of the pre-buy/proposal function, the media service function, the creative instructions function and the post buy service function responsive to a request to the advertising media management system.

24. The system of claim 23, wherein the creative instructions function translates the creative instructions entered from a received file format, populates a creative instructions form from the translated creative instructions entry and transmits the creative instructions form to the at least one advertising platform from the advertising media management system.

25. The system of claim 23, wherein the creative instructions function receive a standard format file from an advertising buyer, authenticates the advertising buyer, translates the standard format file to a format useable by an advertising platform and transmits the translated file to the advertising platform from the advertising media management system.

26. The system of claim 23, wherein the pre-buy/proposal function receives campaign data from the at least one advertising buyer and requests a report regarding a potential success of a campaign based on the campaign data from the at least one advertising platform.

27. The system of claim 23, wherein the pre-buy/proposal function transmits a campaign proposal to an advertising platform through the advertising media management system responsive to an indication of agreement to the campaign proposal by each of an advertising buyer providing the campaign proposal and the advertising platform receiving the campaign proposal.

* * * * *